US010523406B2

(12) United States Patent
Liang et al.

(10) Patent No.: US 10,523,406 B2
(45) Date of Patent: Dec. 31, 2019

(54) SINGLE CHANNEL FULL DUPLEX WIRELESS BASE STATION OR ACCESS POINT

(71) Applicant: Ping Liang, Newport Coast, CA (US)

(72) Inventors: Ping Liang, Newport Coast, CA (US); Dengkui Zhu, Beijing (CN)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 15/576,707

(22) PCT Filed: Jun. 28, 2016

(86) PCT No.: PCT/US2016/039688
§ 371 (c)(1),
(2) Date: Nov. 23, 2017

(87) PCT Pub. No.: WO2017/003966
PCT Pub. Date: Jan. 5, 2017

(65) Prior Publication Data
US 2018/0167191 A1 Jun. 14, 2018

Related U.S. Application Data

(60) Provisional application No. 62/185,673, filed on Jun. 28, 2015.

(51) Int. Cl.
*H04L 5/14* (2006.01)
*H04B 7/06* (2006.01)
*H04L 5/00* (2006.01)
*H04B 7/08* (2006.01)
*H04B 7/022* (2017.01)
*H04B 7/0413* (2017.01)
(Continued)

(52) U.S. Cl.
CPC ........... *H04L 5/1461* (2013.01); *H04B 7/022* (2013.01); *H04B 7/0413* (2013.01); *H04B 7/06* (2013.01);
(Continued)

(58) Field of Classification Search
CPC ....................................................... H04L 5/14
See application file for complete search history.

(56) References Cited

U.S. PATENT DOCUMENTS

2005/0059342 A1* 3/2005 Engels ................ H04B 7/2606
455/7
2007/0268846 A1* 11/2007 Proctor, Jr. ........ H04B 7/15535
370/279
(Continued)

FOREIGN PATENT DOCUMENTS

WO 2014036025 A1 3/2014

OTHER PUBLICATIONS

PCT/US16/39688 Written Opinion of the International Searching Authority dated Oct. 28, 2016.

*Primary Examiner* — Hassan A Phillips
*Assistant Examiner* — Prenell P Jones
(74) *Attorney, Agent, or Firm* — Guosheng Wang; United States Research and Patent Firm

(57) ABSTRACT

This invention presents methods for wireless communication systems implementing SCFD operation comprising adaptively configuring FDPs based on the directional antennas at each BS; measuring the interference levels among UEs located in areas covered by an FDP and determining the UE group that transmits and receives data on the same time-frequency resource(s) under the same FDP; and measuring the channels among neighboring BSs to cancel the interferences between two BSs with SCFD operations.

2 Claims, 8 Drawing Sheets

(51) Int. Cl.
*H04W 72/12* (2009.01)
*H04W 88/02* (2009.01)
*H04W 88/08* (2009.01)

(52) U.S. Cl.
CPC ......... *H04B 7/0608* (2013.01); *H04B 7/0817* (2013.01); *H04B 7/0874* (2013.01); *H04L 5/0023* (2013.01); *H04L 5/0073* (2013.01); *H04L 5/14* (2013.01); *H04W 72/12* (2013.01); *H04W 88/02* (2013.01); *H04W 88/08* (2013.01)

(56) References Cited

U.S. PATENT DOCUMENTS

| | | | |
|---|---|---|---|
| 2012/0003984 A1 | 1/2012 | Cesar et al. | |
| 2012/0003999 A1 | 1/2012 | Shang et al. | |
| 2012/0263125 A1* | 10/2012 | Tejaswini | G06F 9/5011 370/329 |
| 2013/0102254 A1* | 4/2013 | Cyzs | H04B 1/126 455/63.1 |
| 2013/0272226 A1* | 10/2013 | Li | H04W 28/26 370/329 |
| 2014/0022801 A1* | 1/2014 | Yang | F21V 29/004 362/382 |
| 2015/0229461 A1* | 8/2015 | DiFazio | H04L 5/14 370/280 |
| 2015/0280887 A1* | 10/2015 | Ko | H04B 1/525 370/330 |
| 2016/0112161 A1* | 4/2016 | Li | H04W 28/26 370/277 |
| 2018/0139800 A1* | 5/2018 | Kyles | H04B 1/401 |
| 2018/0167191 A1* | 6/2018 | Liang | H04L 5/1461 |
| 2018/0317097 A1* | 11/2018 | Senior | H04W 16/26 |
| 2019/0021132 A1* | 1/2019 | Kyles | H04B 1/401 |

* cited by examiner

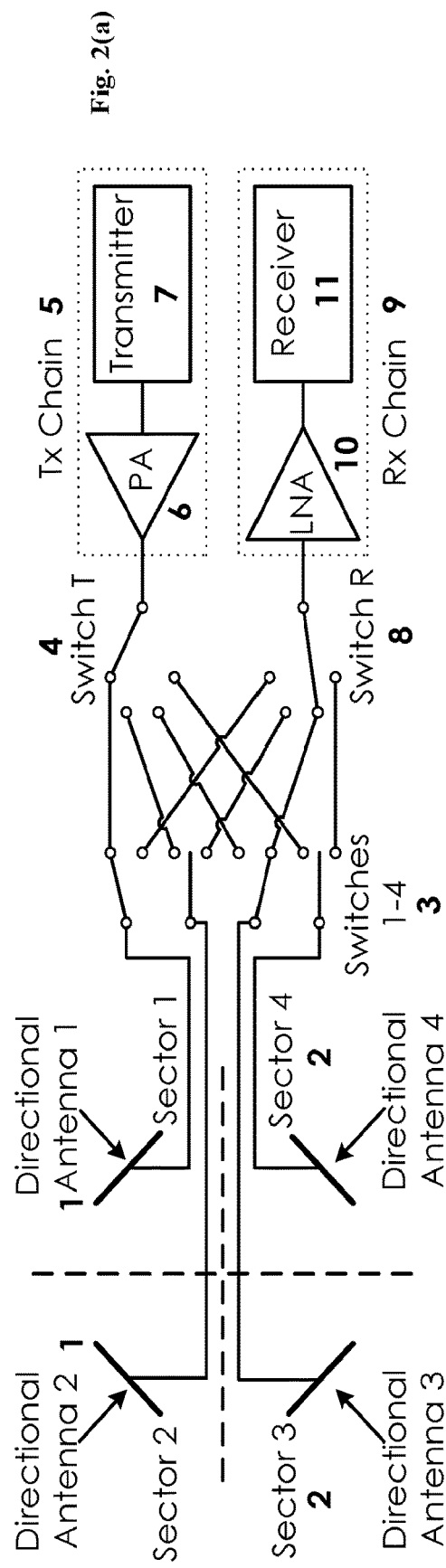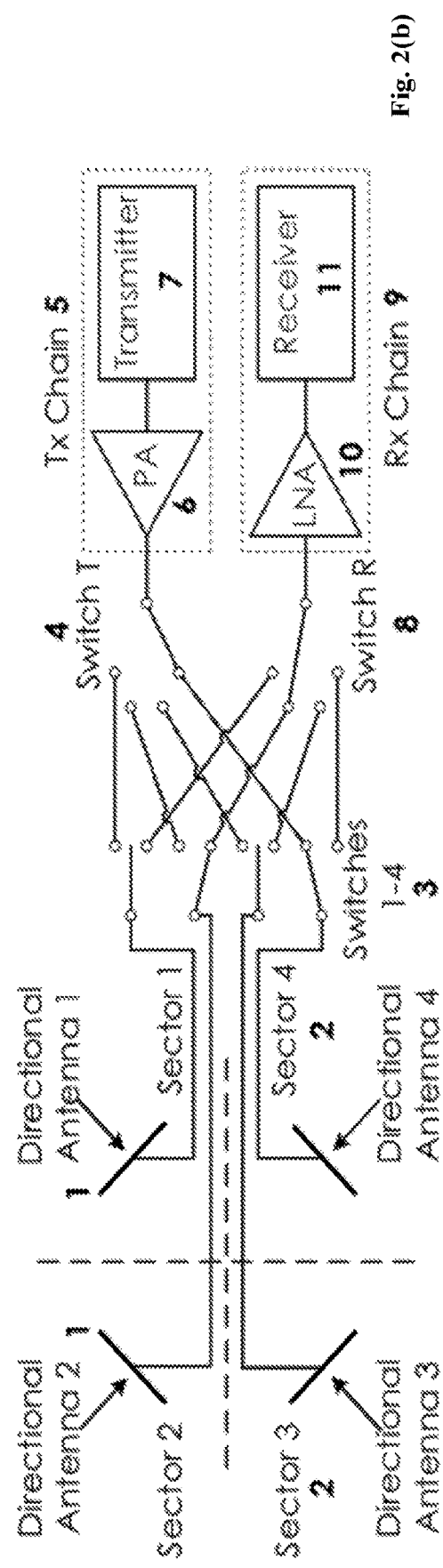

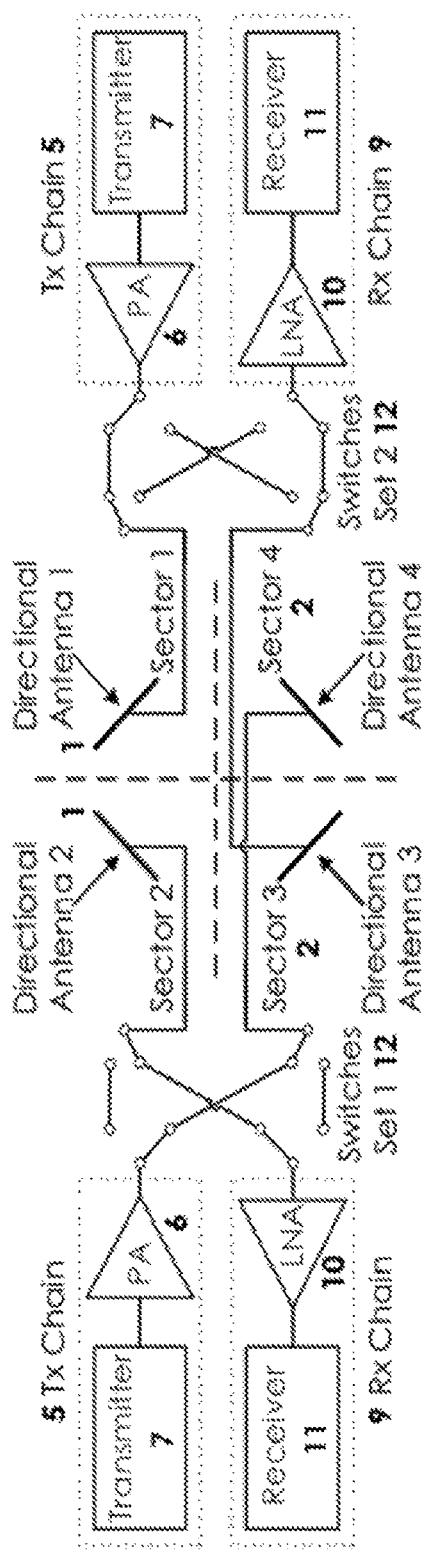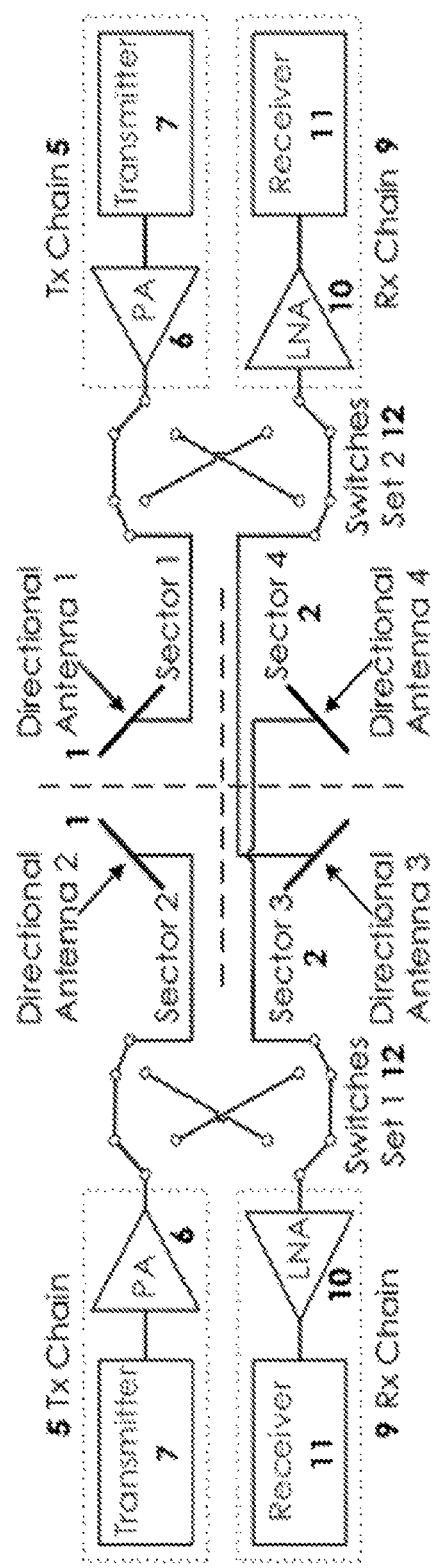
Fig. 3(a)
Fig. 3(b)

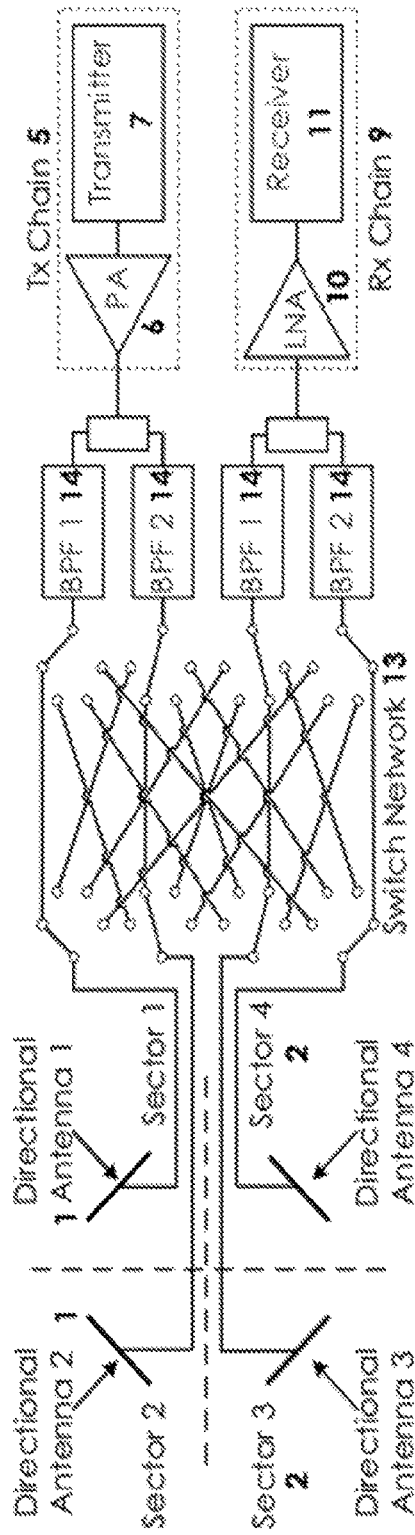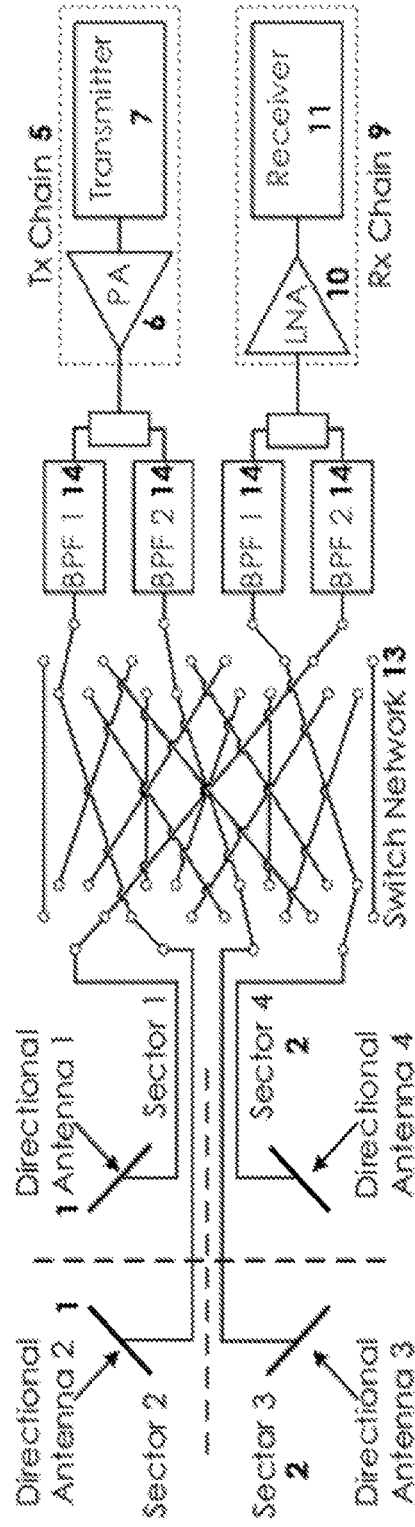

SINGLE CHANNEL FULL DUPLEX WIRELESS BASE STATION OR ACCESS POINT

This application claims the benefit of U.S. Provisional Application No. 62/185,673, filed on Jun. 28, 2015.

FIELD OF THE INVENTION

This invention relates generally to wireless communications, and more particular, to wireless Base Station (BS) or Access Point (AP) that can simultaneously transmit and receive in the same frequency channel.

BACKGROUND

It is well known for decades that if a receiver of radio device, e.g., a wireless BS or AP (hereafter all referred to as BS), can effectively cancel the received radio signal from a transmitter located on the same device (referred to as self-interference) or from a nearby radio device, the radio device can simultaneously transmit and receive radio signals in the same frequency channel, assuming noise and other interferences are sufficiently lower than the intended signal to be received. Various methods for canceling the self-interference have been known, e.g. in references [1] [2] [3] [4]. Prior arts suffer from insufficient cancelation of self-interference, and often leave too much remaining self-interference after cancelation, especially when the transmitted power is high. We invented a new method and circuits for self-interference cancelation that offers significantly better performance than prior arts, thus, enabling practical Single Channel Full Duplex (SCFD) radios that were previously not feasible.

BRIEF DESCRIPTION OF THE DRAWINGS

FIGS. 2(a) and 2(b) show switching a Transmitter (Tx) chain and a Receiver (Rx) chain to enable SCFD in a Full Duplex Pair (FDP).

FIGS. 3(a) and (b) show a configuration with two pairs of Tx chains and Rx chains to support two FDPs to operate in SCFD simultaneously.

FIGS. 3(c) and (d) show a configuration with one pair of Tx chain and Rx chain and Band-Pass Filters (BPFs) to support two FDPs to operate in SCFD simultaneously.

DETAILED DESCRIPTION OF THE PREFERRED EMBODIMENTS

Figure 1:
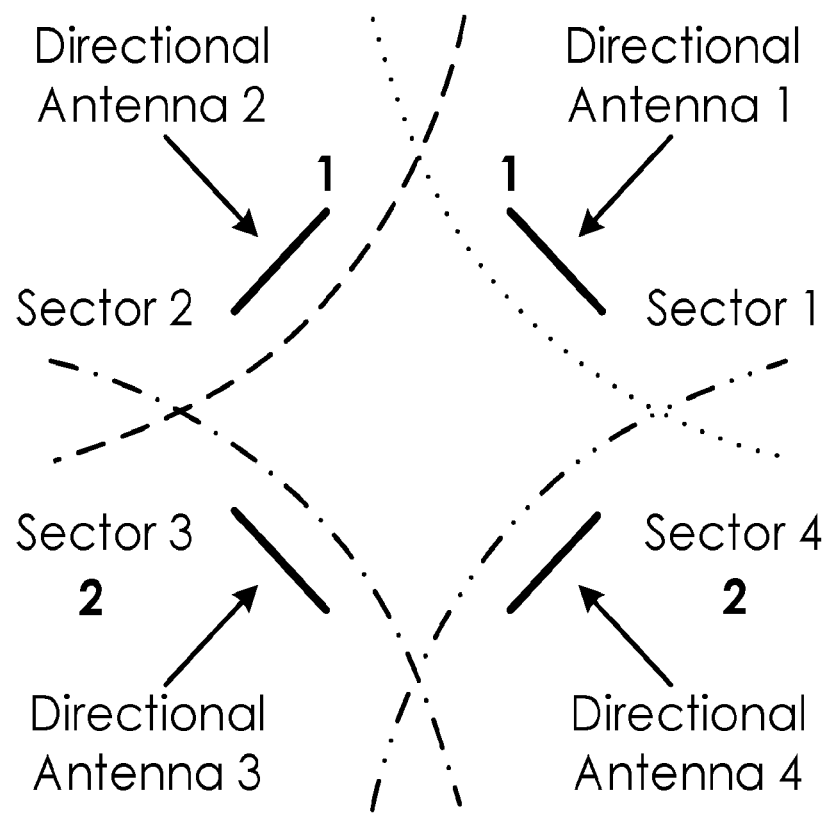
FIG. 1 shows the partition of an area into sectors using directional antennas for SCFD operations.

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof.

One embodiment using a simple way to implement SCFD in a wireless network without requiring Mobile Terminal (MT) being capable of SCFD is to make a BS SCFD and have the BS simultaneously transmit to a first MT and receive from a second MT. This enables SCFD BSs to be deployed in a Time-Division Duplex (TDD) or Frequency-Division Duplex (FDD) network under existing wireless network standards such as Long-Term Evolution (LTE) or WiFi (802.11).

In a network setting, just cancelling self-interference from an SCFD BS' Radio Frequency (RF) Tx to its RF Rx is not enough for SCFD because SCFD creates additional interferences not present in prior art of FDD and TDD. Such additional interferences include the following types.

A. User Equipment (UE) to UE interference. Since an SCFD BS simultaneously transmits in the Downlink (DL) direction to a first UE and receives in the Uplink (UL) direction from a second UE in the same frequencies, the transmission from a second UE causes interference to the receiving by a first UE. When the first UE and the second UE are in the same cell, this is referred to as intra-cell UE to UE interference. When the first UE and the second UE are in two different cells, this is referred to as inter-cell UE to UE interference. Since UE transmits at relatively low power, e.g., 23 dBm, intra-cell UE to UE interference is more of an issue than inter-cell UE to UE interference, except at edges of neighboring cells.

B. BS to BS interference. Since an SCFD BS simultaneously transmits in the DL direction to a first UE and receives in the UL direction from a second UE in the same frequencies, when nearby BSs use the same frequencies such as LTE networks with frequency reuse factor of 1, the transmission from a first BS causes interference to the receiving of a second BS. Since a BS may transmit at much higher power, e.g., 43 dBm, than a UE, BS to BS interference may need to be removed for SCFD to work in a network environment.

Other interferences such as inter-cell BS to UE interference exist in current cellular network environments and existing techniques can be used to combat them.

Avoiding Intra-Cell UE to UE Interference

Several embodiments of a method for avoiding intra-cell UE to UE interferences are described below. In the following context, the coverage area of a directional antenna (defined by the area within which the RF power from a corresponding antenna decays less than a certain level from the Tx power, e.g., no less than 3 dB or 20 dB below the Tx power) is referred to as a sector and the sectors are numbered using their antenna numbers, i.e., the coverage area of Antenna 1 is referred to as Sector 1. An example of a four-sector cell is presented in FIG. 1, where each of the four directional antennas 1 corresponds to one sector 2.

The sectors, i.e., the coverage areas of the neighboring directional antennas, may overlap as long as there is sufficient separation between the coverage areas of the two directional antennas in the opposing directions as illustrated in FIG. 1, e.g., each antenna beam may be between 90° to 120° in the azimuth. The two directional antennas in the opposing directions are referred to as a Full Duplex Pair (FDP). An FDP may also be used to denote the coverage areas of such two directional antennas. For example, in FIG.

1, Antennas 1 and 3, and correspondingly Sectors 1 and 3 form an FDP, and Antennas 2 and 4, and correspondingly Sectors 2 and 4 form another FDP. The gap of separation in question is the gap between the coverage areas of the two antennas in an FDP, i.e., the gap of separation between Sectors 1 and 3, and the gap of separation between Sectors 2 and 4. The differently dashed curved lines indicate where the RF wave power from a corresponding antenna decays to a certain level from the Tx power, e.g., 20 dB.

It uses four or more directional antennas where each antenna is centered at a distinctive direction and two antennas form an FDP. An FDP is defined as two directional antennas whose coverage areas are sufficiently separated with a gap and the gap is covered by another FDP, as illustrated in FIG. 1, where Antennas 1 and 3 are an FDP and Antennas 2 and 4 are another FDP. The gap of separation for an FDP formed by its two antennas is the space in which the Received Signal Strength (RSS) by a UE from transmission of the two antennas of the FDP is very low, e.g., close to or below the sensitivity level of the receiver on the UE. The gap should be sufficiently wide so that if at least one of a first UE in the coverage area of a first antenna in an FDP and a second UE in the coverage area of a second antenna in the FDP is not in the vicinity of the BS, then the interference caused by one of the UEs transmitting in the UL direction on the other UE receiving in the DL direction is sufficiently low, e.g., allowing a Signal-to-Interference-plus-Noise Ratio (SINR) of 30 dB or higher at the receiving UE.

In one embodiment, one pair of Tx chain and Rx chain is used at an SCFD BS and the TX chain and Rx chain are connected to one FDP at a time using a RF switch network, as shown in FIG. 2. In FIG. 2, Switches 1-4 3 are used to switch between the Tx mode and the Rx mode for Antennas 1-4 1 respectively, Switch T 4 is to switch among Antennas 1-4 to connect the Tx chain 5 that includes a Power Amplifier (PA) 6 and a transmitter 7, and Switch R 8 is to switch among Antennas 1-4 to connect the Rx chain 9 that includes a Linear Noise Amplifier (LNA) 10 and a receiver 11. To avoid the likelihood of intra-cell UE to UE interference, the BS schedules the DL transmission in one sector in an FDP and the UL transmission in another sector of the FDP. In each FDP, either one of the antennas can be connected to the Tx chain while the other one is connected to the Rx chain. FIG. 2(*a*) shows an SCFD configuration in which Antennas 1 and 3 form an FDP, where the BS sends DL signals to a first UE in Sector 1 and receives UL signals from a second UE in Sector 3, all in the same frequency elements and at the same time. FIG. 2(*b*) shows an SCFD configuration in which Antennas 2 and 4 form an FDP, where the BS sends DL signals to a first UE in Sector 4 and receives UL signals from a second UE in Sector 2, all in the same frequency elements and at the same time. The separation gap between the sectors in an FDP can guarantee that the first UE and the second UE are sufficiently far apart to avoid intra-cell UE to UE interference, provided that at least one of the two UEs is not in a close distance to the BS. Therefore, transmitting and receiving RF signals in an FDP are separated by space to control UE to UE interference in SCFD operation, i.e., simultaneous transmitting and receiving in the same frequency.

In another embodiment, to avoid the selection of two UEs, one in each sector in an FDP, that are both in close distances to the BS, the BS obtains the RSS of each UE transmitting at the same power level and on the same frequency resource, e.g., the same set of subcarriers in an OFDM system. The BS avoids selecting two UEs both of which have RSS above a threshold, indicating that they are highly likely both within short distances to the BS. The BS may schedule two or more UEs to transmit signals on the same frequency resource(s) in the following way. The BS first receives the signals and obtains the RSS of the received signals. Then, the BS compares the RSS of the signals from two UEs, each of which is in an FDP, to a threshold. If the two RSS values are both above a threshold, these two UEs are not selected for SCFD operation. If not, the BS can perform SCFD operation with these two UEs, i.e., transmitting DL signals to one of them and receiving UL signals from the other one, at the same time and using the same frequency resource. The BS may also check whether the difference of the RSS of the two UEs is sufficiently large in deciding whether to select the two UEs for SCFD operation. A sufficiently large difference also increases the likelihood of the two UEs being sufficiently far apart, especially when the wireless transmission is mainly Light-of-Sight (LoS), and may be used in the selection of two UEs for SCFD operation in two FDPs. In the similar way, more than two UEs can be scheduled to transmit signals on the same frequency resource(s)

In an alternative embodiment, one pair of Tx chain and Rx chain is dedicated to one FDP, e.g., Antennas 1 and 3, and a second pair of Tx chain and Rx chain is dedicated to another FDP, e.g., Antennas 2 and 4, as shown in FIGS. 3(*a*) and 3(*b*), by two switch sets 12, where Switch Set 1 switches among different modes for the FDP consisted of Antennas 2 and 4 and Switch Set 2 switches among different modes for the FDP consisted of Antennas 1 and 3. In this embodiment, the two pairs of Tx chains and Rx chains can support two FDPs operating simultaneously, where each FDP uses different frequency resource(s), e.g., non-overlapping subsets of subcarriers, for SCFD in its two sectors. In the example of FIG. 3(*a*), Sectors 1 and 3 operate in SCFD with Antenna 1 transmitting and Antenna 3 receiving simultaneously in a first frequency resource(s), and Sectors 2 and 4 operate in SCFD with Antenna 4 transmitting and Antenna 2 receiving simultaneously in a second frequency resource(s), where the first and second frequency resource(s) are not overlapping. The two sets of switches, Switch Set 1 and Switch Set 2, can switch independently but switches in each set move together. In the example of FIG. 3(*b*), switches in Switch Set 1 change positions but switches in Switch Set 2 remain unchanged. As a result, Sectors 1 and 3 continue to operate in SCFD with Antenna 1 transmitting and Antenna 3 receiving simultaneously in a first frequency resource(s), but Sectors 2 and 4 change the transmitter and receiver connections, with Antenna 2 transmitting and Antenna 4 receiving simultaneously in a second frequency resource(s). As is evident, other configurations of the two FDPs' SCFD operations can also be achieved. Multiple FDPs allow partition and/or filling of the coverage areas by frequency, i.e., the frequency division, while transmitting and receiving RF signals in an FDP are separated by space to control UE to UE interference. Because the two FDPs operate in different frequencies, they do not generate in-band interference for SCFD operation of each other, and each FDP offers the separation gap for SCFD operation of the two antennas in the other FDP. However, the adjacent FDP does generate out-band or adjacent band interference on its neighboring FDP. Configurable Band-Pass Filters (BPFs) can be added to each Rx chain, e.g., before each LNA, to suppress the out-band or adjacent band interference going into the Rx chain, and added to each Tx chain, e.g., after each PA, to suppress the transmission of out-band or adjacent band interference going into the antenna.

In yet another embodiment, employment of BPFs allows the use of one set of Tx chain and Rx chain to support two or more FDPs operating simultaneously with each FDP using different frequency ranges, or subsets of subcarriers, as shown in FIGS. 3(c) and 3(d), where a switch network 13 is used to connect Antennas 1-4 to the Tx chain or the Rx chain through four BPFs 14 corresponding to Antennas 1-4 respectively. The Tx chain and Rx chain can transmit and receive in the entire allocated frequency band and BPFs are used to select the actual frequency resource(s) used for transmitting and receiving. BPF 1 and BPF 2 in the figures can be configurable filters such that their pass-band settings can be changed using control signals to allow different frequency ranges being used by each of the FDP. In the example in FIG. 3(c), the FDP of Antennas 1 and 3 uses a first frequency defined by BPF 1 for SCFD operation with Antenna 1 transmitting and Antenna 3 receiving, and the other FDP of Antennas 2 and 4 uses a second frequency defined by BPF 2 for SCFD operation with Antenna 2 transmitting and Antenna 4 receiving. Changing the positions of the switch network can configure the antenna pair in either FDP to transmit or receive in either frequency band defined by BPF 1 and BPF 2. In the example in FIG. 3(d), the FDP of Antennas 1 and 3 changes to use the second frequency defined by BPF 2 for SCFD operation while Antenna 1 becomes receiving and Antenna 3 becomes transmitting, and the other FDP of Antennas 2 and 4 changes to use the first frequency defined by BPF 1 for SCFD operation while Antenna 2 remains transmitting and Antenna 4 remains receiving. Because the two FDPs operate in different frequencies, they do not generate in-band interference for SCFD operation of each other, and each FDP offers the separation gap for SCFD operation of the two antennas in the other FDP. The out-band or adjacent band interference generated by a neighboring FDP is suppressed by the BPFs. Similarly to FIG. 3, multiple FDPs in different frequency bands allow partition and/or filling of the coverage areas by frequency while transmitting and receiving RF signals in an FDP are separated by space to control UE to UE interference.

In a Multiple-Input Multiple-Output (MIMIO) embodiment of intra-cell UE to UE interference control in SCFD, two or more Tx chains and two or more Rx chains at a BS operate in SCFD mode, i.e., two or more Tx chains at the BS transmit DL signals to one or more UE receiving chains (each UE may receive using one or more receiving chains), and two or more Rx chains at the BS receive UL signals from one or more UE transmitting chains (each UE may transmit using one or more transmitting chains), all at the same time and using the same frequency resource. The Tx chains and Rx chains are connected to directional antennas through a set of Tx-Rx switches. The directional antennas are grouped into one or more FDPs where each FDP comprises of two groups of directional antennas covering non-overlapping areas, typically back to back and not bordering on sides of the coverage areas. The coverage areas of the directional antennas in each group of an FDP overlap but do not completely overlap, and the intersection of the coverage areas of all antennas in a group of an FDP is referred to as a Zone. In an example illustrated in FIG. 4, two zones 15 are formed by Antennas 1-4, where Zone 1 is the intersection of the coverage areas of Antennas 1 and 2, and Zone 2 is the intersection of the coverage areas of Antennas 3 and 4. The switches connecting to antennas in one group in an FDP change positions together so that they are either all transmitting or all receiving. A separation gap is needed between the two zones in an FDP such that the interference of a transmitting UE in one zone on a UE in another zone simultaneously receiving using the same frequency resource is sufficiently low to allow the BS operate in SCFD mode with the two UEs. The non-overlapping parts of the coverage areas of the antennas in the FDP and the directionality as well as the separation distance between the two groups of antennas provide the separation gap. In each of the zone, the BS can operate in MIMO mode, using either spatial diversity or spatial multiplexing to increase the data throughput.

Figure 4:
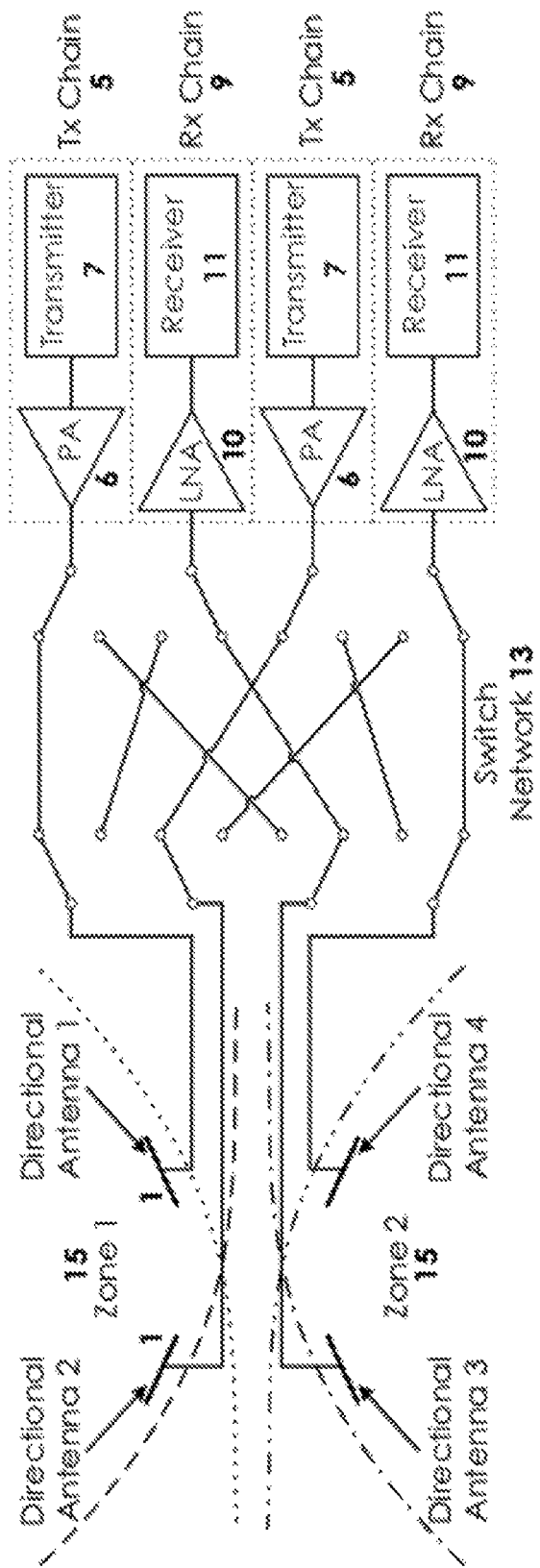
FIG. 4 shows a Multiple-Input Multiple-Output (MIMO) configuration for SCFD in an FDP and the partition of space into Zones.
Figure 5:
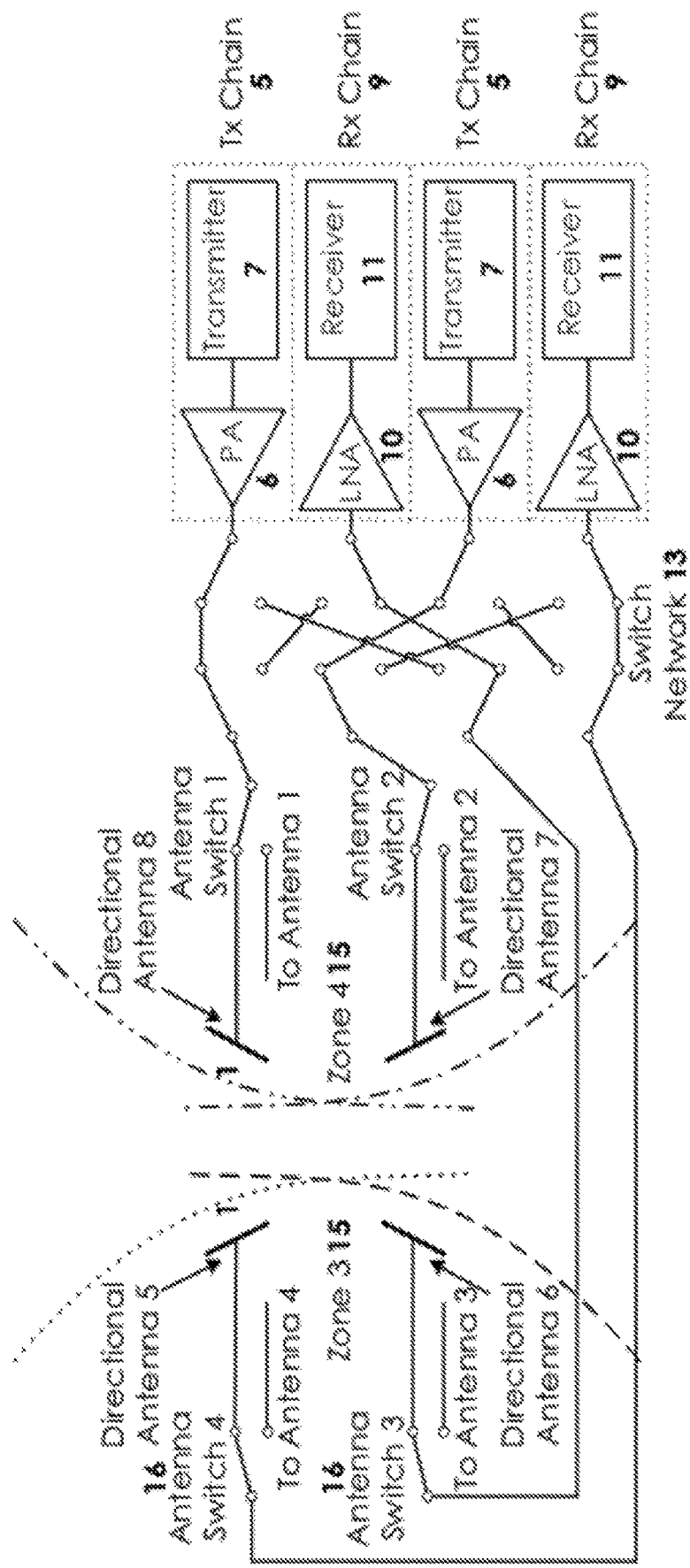
FIG. 5 shows switching two pairs of Tx chains and Rx chains to enable MIMO for SCFD in one of two FDPs.

FIG. 5 shows an embodiment using eight directional antennas to form two FDPs so that areas not covered by zones in one FDP, can be covered. For example, Zones 1 and 2 in FIG. 4 are covered by the FDP of Antennas 1-4, but some areas of Zones 3 and 4 in FIG. 5 are not covered by Antennas 1-4. An additional set of switches, i.e., Antenna Switches 1-4 16 shown in FIG. 5, is used to switch between the antennas in the two FDPs. When the antenna switches are in the positions shown in FIG. 5, Antennas 5-8 are connected to the Tx chains and Rx chains to support SCFD operation in Zones 3 and 4. When the antenna switches change to the other positions, Antennas 1-4 are connected to the Tx chains and Rx chains, having the same effect as in FIG. 4 to support SCFD operation in Zones 1 and 2. Note that for easy viewing, Antennas 1-4 are not drawn in FIG. 5, and only switch contacts and cable connections to them are shown.

The MIMO embodiment can also be extended to multiple FDPs using different frequency bands to allow partition and/or filling of the coverage areas by frequency while separating transmitting and receiving RF signals in an FDP by space to control UE to UE interference. One such embodiment removes the antenna switches and adds two additional pairs of Tx chains and Rx chains to the embodiment in FIG. 5 to support the FDP formed by Antennas 1 and 2 for Zone 1 and Antennas 3 and 4 for Zone 2. The additional pairs of Tx chains and Rx chains are connected to Antennas 1-4 in the same way as the two pairs of Tx chains and Rx chains are connected to Antennas 5-8. The two FDPs can simultaneously operate in SCFD using different frequency resources. Because the two FDPs operate in different frequencies, they do not generate in-band interference for SCFD operation of each other, and each FDP offers the separation gap for SCFD operation of the four antennas in the other FDP. However, the adjacent FDP does generate out-band or adjacent band interference on its neighboring FDP. Configurable BPFs can be added to each Rx chain, e.g., before each LNA, to suppress the out-band or adjacent band interference going into the Rx chain, and added to each Tx chain, e.g., after each PA, to suppress the transmission of the out-band or adjacent band interference going into the antenna.

Figure 6:
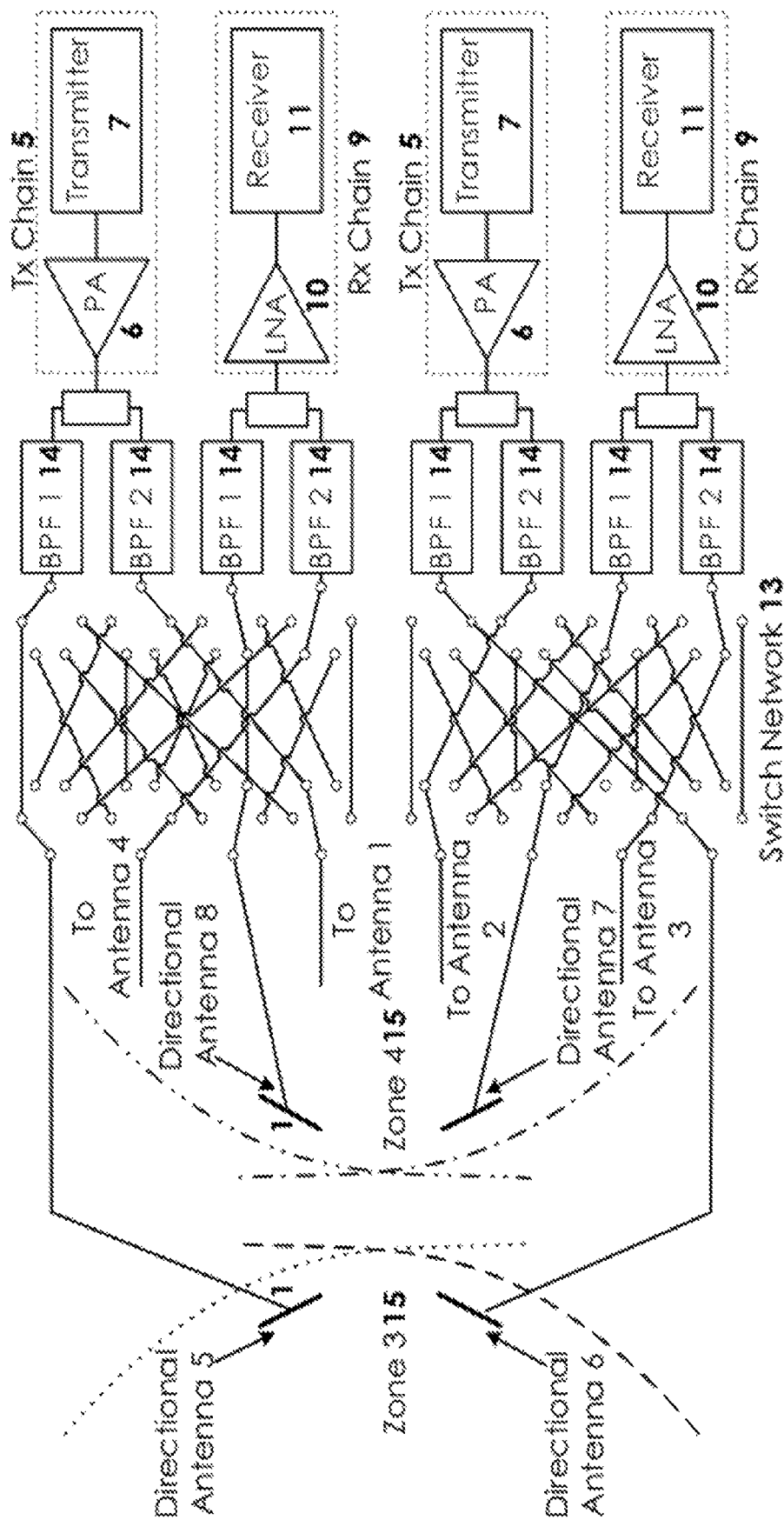
FIG. 6 shows using two pairs of Tx chains and Rx chains and BPFs to enable MIMO for SCFD in two FDPs simultaneously.

Instead of using four pairs of Tx chains and Rx chains, another such embodiment uses only two pairs of Tx chains and Rx chains and BPFs to support two FDPs simultaneously, each using a different frequency resource, as shown in FIG. 6. The Tx chains and Rx chains can transmit and receive in the entire allocated frequency band, and BPFs, e.g., BPF 1 if a first frequency resource is used or BPF 2 if a non-overlapping second frequency resource is used, are used to select the actual frequency resource(s) used for transmit and receive. The RF switch network allows each antenna to select one of four settings, i.e., transmitting via BPF 1, transmitting via BPF 2, receiving via BPF 1, and receiving via BPF 2.

After a pair of UEs is selected for SCFD operation, one embodiment uses a confirmation step to check the level of intra-cell UE to UE interference. In the same time slot, the BS schedules DL pilot to UE A and UL pilot from UE B. Then, UE A computes the Channel Quality Indicator (CQI)

and feeds back the CQI to the BS, and the BS uses the CQI of UE A to decide whether to proceed SCFD operation with UE A and UE B.

The inter-cell UE to UE interference caused by SCFD in neighboring cells can be controlled by coordinating the neighboring cells at the cell edge such as having UEs in neighboring cells using different frequency resources to avoid the interference when transmitting at the same time.

Canceling Inter-Cell BS to BS Interference

Inter-cell BS to BS interference does not only arise from SCFD but also from dynamic TDD in which a cell is allowed to select the DL or UL mode based on the traffic demands of UEs. One embodiment uses a Centralized Radio Access Network (C-RAN) configuration to cancel BS to BS interference. In this embodiment, the baseband signals from neighboring BSs are processed by a centrally located baseband processor or baseband processors that are connected with high speed data connections. The baseband processor(s), referred to C-RAN processor(s), uses estimations of the channels $h_{ij}$ (the channel from the ith transmitter to the jth receiver) between the neighboring BSs, and the baseband signals $s_i$, i=1, 2, . . . , m, (the number of transmitters causing BS to BS interference), sent to the ith transmitter of one BS for transmission, to generate cancelation signals $c_{ij}=h_{ij}s_i$ for the signal $y_j$ received by the jth receiver of another BS. The combination of the received signal and the cancelation signals produces a recovered signal $x_j$ that cancels out the interferences, up to the accuracy of the Analog-to-Digital Converter (ADC) and Digital-to-Analog Converter (DAC), the accuracy of the channel estimation, and the accuracy of channel models.

The recovered signal $$x_j = y_j + \sum_{j \neq i}^{m} h_{ij}s_i = d_j + e + n,$$

where $d_j$ is the desired signal (free of BS to BS interferences) to be received by the jth receiver, e is the remaining error from imperfect cancelation, and n is the noise.

This digital cancelation embodiment requires that the interferences do not cause blocking of the amplifiers of the receivers, e.g., several dBs below P1dB of the amplifiers, and do not saturate the ADC. These requirements can be satisfied in most cases with separation distances among the BSs and coordinating their transmitting power levels. Selection of amplifiers of the receivers and their ADCs can also be made to help satisfying the requirements.

The method also comprises the BSs sending predefined pilot signals for channel estimation. In Addition, the channel estimation process may be performed multiple times, e.g., periodically or when needed, because the channel may change when the RF environment changes. A typical BS has more than one antenna. The following description is applicable to each antenna on a BS, i.e., a BS transmitting a predefined pilot signal should be understood as the BS transmitting using one of its antennas in the case of multiple antennas on a BS, and the process is repeated for each of its antennas.

The following embodiments employ the principle that a channel is approximately the same in a small frequency region near a selected subcarrier to reduce the amount of time needed to estimate channels among the antennas of multiple interfering BSs. It uses transmission of a pilot signal occupying selected subcarriers instead of all the subcarriers of the frequency channel for channel estimation. In one embodiment, a BS, using one transmitter, e.g. $Tx_i$, sends a predefined pilot signal over the frequency range of the channel and all antennas on the other neighboring BSs receive the pilot signal and use the received signal to estimate the channel from $Tx_i$ to $Rx_j$, $h_{ij}$, $j \neq i$, and each of the neighboring BSs take turns. In another embodiment, the frequency range of the channel is divided into intervals, e.g., each interval with 12 subcarriers, and a first subset of BSs (or selected transmitters on the BSs of the first subset in the case of multiple antennas on a BS) transmit predefined pilot signals simultaneously but each transmitter in the subset uses different subcarrier(s) in each of the frequency intervals, and the neighboring BSs, i.e., the neighboring BSs that receive BS to BS interferences from transmitters of the BSs in the first subset, receive the pilot signals from the BSs in the first subset and use the received signals to estimate the channels from each of the transmitter(s) in the first subset to each of the receivers of the neighboring BSs. At another time slot, a second subset of BSs (or selected antennas of a second subset of BSs in the case of multiple antennas on a BS) transmit predefined pilot signals simultaneously but each transmitter in the subset uses different subcarrier(s) in each of the frequency intervals, and the receivers of the other neighboring BSs, including the BSs in the first subset, receive the pilot signals from transmitters on the BSs in the second subset and use the received signals to estimate the channels from each of the transmitters in the second subset to each of the receivers of the neighboring BSs. All BSs may be grouped into two or more such subsets. The sharing of the frequency range by multiple BSs in a subset allows multiple BSs to transmit pilot signals simultaneously to reduce the amount of time needed to perform BS to BS channel estimation. Each transmitter should choose at least one subcarrier from each of the frequency intervals or most of the frequency intervals so that the channel estimation is sufficiently accurate over the entire frequency channel.

Another embodiment uses the reciprocity of the over-the-air BS to BS channels to reduce the amount of time needed for channel estimation. The channel $h_{ij}$ from $Tx_i$ to $Rx_j$ comprises $h_{ij}=t_i h_{ij}^a r_j$ where $t_i$ is the transfer function of the transmitter $Tx_i$ on the transmitting BS, $h_{ij}^a$ is the over-the-air channel from the antenna on $Tx_i$ to the antenna on $Rx_j$, and $r_j$ is the transfer function of the receiver $Rx_j$ of the receiving BS. If each of the antennas is used for both transmitting and receiving, the over-the-air channel between the ith antenna and the jth antenna is reciprocal, i.e., $h_{ij}^a=h_{ij}^a$. Therefore, the over-the-air channel between the ith antenna and the jth antenna only needs to be estimated once, in either one direction. The transfer functions $t_i$ and r are characteristics of the transmitters and receivers of the BSs and can be estimated and stored in memory for later use. They may depend on temperature and other external parameters. In such cases, the transfer functions can be estimated under different temperatures and other parameters if present, and the estimated transfer functions at different conditions are stored in a look-up table. They can be recalled when they are needed. Sensors, e.g., temperature sensors, can be installed to measure the temperatures of the transmitters and receivers so that the transfer functions at the current temperature can be retrieved for estimating $h_{ij}$. Interpolation may be applied for temperatures not present in the look-up table. Since the transfer functions may also change over time, e.g., aging of hardware, the estimations of the transfer functions $t_i$ and $r_j$ may need to be repeated over time, however, the time interval between such estimations is much longer than the time interval between estimations of the over-the-air channels. Hence, pre-estimation and/or infrequent estimation of the transfer functions $t_i$ and $r_j$ plus storing them is advantageous. The stored estimations of $t_i$ and $r_j$ reduce the amount of time needed to estimate $h_{ij}$ to half using the reciprocity of the over-the-air channels, because once $h_{ij}^a$ is estimated, $h_{ji}^a$ is known automatically.

Estimations of over-the-air channels may need to be repeated frequently because environmental factors cause changes to the channels, e.g., raining, moving objects, etc. One embodiment re-estimates the over-the-air channels with time intervals no longer than the coherence time of the over-the-air channels so that the channel estimations are always sufficiently accurate.

Figure 7:
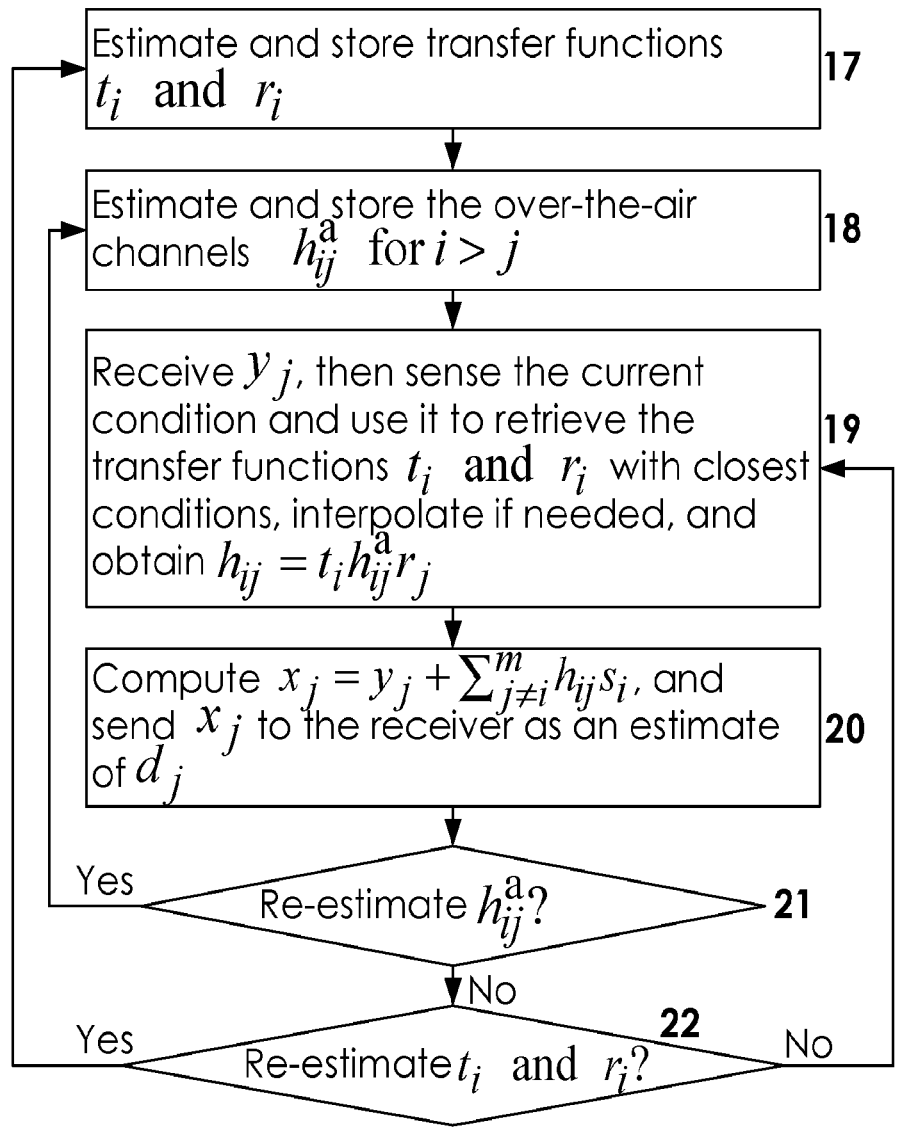
FIG. 7 shows the flowchart to cancel BS to BS interferences based on the over-the-air channel reciprocity.

FIG. 7 shows the flowchart to cancel BS to BS interferences based on the over-the-air channel reciprocity. Specifically, the transfer functions $t_i$ and $r_j$ are first estimated and stored 17. Then, the over-the-air channels $h_{ij}^a$ are estimated and stored for i>j 18. Next, the C-RAN processor(s) receives $y_j$, then senses the current condition and uses it to retrieve the transfer functions $t_i$ and $r_j$ with closest conditions, interpolates if needed, and obtains $h_{ij}=t_i h_{ij}^a r_j$ 19. After that, the C-RAN processor(s) computes $$x_j = y_j + \sum_{j \neq i}^{m} h_{ij} s_i$$

and sends $x_j$ to the jth receiver as an estimate of $d_j$ 20. Next, whether $h_{ij}^a$ needs to be re-estimated is checked 21. If yes, the process jumps back to 18 and continues. If no, the process continues to check whether $t_i$ and $r_j$ need to be re-estimated. If yes, the process jumps back to 17 and continues. Otherwise, the process jumps back to 19 and continues.

The BS to BS interferences caused by one BS or one subset of BSs to receiver(s) on a faraway BS or subset of BSs may be negligible. In one embodiment, only neighboring BSs that receive sufficiently strong pilot signals from the transmitter(s) of a BS or subset of BSs perform estimation of the channels from the transmitter(s) to the receivers, and vice versa. In the case of reciprocal over-the-air channels, the over-the-air channel estimations in the reverse direction are not performed. Only signals, from the transmitters for which channel estimations are performed because they cause non-negligible BS to BS interferences, are used in the generation of the cancelation signals at a receiver. Effectively, transmitting signals from the BSs within a certain neighborhood surrounding a receiver are used in the generation of the cancelation signals at the receiver. The shape of the neighborhood depends on the RF propagation environment surrounding the BSs.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

REFERENCE

[1] Gary Robert Kenworthy, "Self-cancelling full-duplex RF communication system", U.S. Pat. No. 5,691,978 A, published on Nov. 25, 1997.
[2] Hua, Y., MA, Y., Gholin, A., LI, Y., Ciric, A., and Liang, P., "Radio Self-Interference Cancellation by Transmit Beamforming, All-Analog Cancellation and Blind Digital Tuning," Signal Processing, pp. 322-340, 2015.
[3] Hua, Y., Liang, P, Ma, Y., Cirik, A., Gao, Q., "A Method for Broadband Full-Duplex MIMO Radio", IEEE SIGNAL PROCESSING LETTERS, VOL. 19, NO. 12, DECEMBER 2012.
[4] Dinesh Bharadia, Emily McMilin, Sachin Katti, "Full Duplex Radios", SIGCOMM'13, Aug. 12-16, 2013, Hong Kong, China.

We claim:

1. A method for Single Channel Full Duplex (SCFD) in a Multiple-Input Multiple-Output (MIMIO) wireless communication network to avoid intra-cell User Equipment (UE) to UE interference comprising:
   using two or more transmitting (Tx) chains and two or more receiving (Rx) chains at a BS which operates in SCFD mode with two or more Tx chains at the BS transmitting downlink (DL) signals to one or more UE receiving chains, and two or more Rx chains at the BS receiving uplink (UL) signals from one or more UE transmitting chains, all at the same time and using the same frequency resource;
   connecting the Tx chains and Rx chains at the BS which are connected to directional antennas through a set of Tx-Rx switches wherein the directional antennas are grouped into one or more Full Duplex Pairs (FDPs) and each FDP comprising two groups of directional antennas covering non-overlapping areas, typically back to back and not bordering on sides of the coverage areas of each other;
   changing the positions of the switches which connect the Tx chains or Rx chains of an FDP to antennas in one group in the FDP together so that the antennas in the group are either all transmitting or all receiving; and
   operating the BS in MIMO mode in an area covered by a plural of antennas in a group of an FDP, using either spatial diversity or spatial multiplexing to increase the data throughput.

2. The method of claim 1 further comprising multiple FDPs using different frequency bands to allow partition and/or filling of the coverage areas by frequency while separating transmitting and receiving RF signals in an FDP by space to control UE to UE interference.

* * * * *